United States Patent Office 2,913,346
Patented Nov. 17, 1959

2,913,346

POROUS PLASTER BODIES AND METHOD OF MAKING SAME

Herbert Edward Hoffman, Cleveland, Ohio

No Drawing. Application May 28, 1958
Serial No. 738,253

8 Claims. (Cl. 106—88)

This invention relates to porous plaster bodies and a method of making the same.

The principal objects of the invention are to provide low cost, highly porous and lightweight, plaster bodies in which the pores are intercommunicating, and which bodies have sufficient structural strength to be handled for shipment and subsequent use but are sufficiently soft when fully dry to be easily cut into pieces of desired sizes and shapes for use, without crumbling; and to provide a rapid, low cost method of making such plaster bodies, requiring only the simplest of equipment.

The porous bodies contemplated by the present invention are preferably in the form of blocks or slabs of any size and shape dictated by the use to be made of them.

The use for which such plaster bodies have been primarily developed is for absorbing and holding a large volume of water in an immobile state and for receiving the stems of cut flowers, which may be easily pushed into the water permeated blocks. Heretofore, so-called "plastic foams" have been used for the same purpose by florists and decorators for preserving cut flowers during shipment and handling, the water absorbed in the pores of the material being retained around and in contact with the stems of the flowers but being held in a substantially immobile condition in the porous bodies so that it cannot be spilled and will evaporate only very slowly. The principal objection to such plastic foams is their relatively high cost, both as regards the settable synthetic resin materials of which they are made and as regards the cost of manufacturing the plastic foams.

The present invention provides a porous product having practically the same physical properties desired for the above use as do the plastic foams used heretofore. However, by reason of the low cost of raw materials and production equipment required, and the high production capacity of such equipment when employing the method of the present invention the product of the present invention may be made at much lower cost.

While the plaster bodies of the present invention are of particular value for holding and preserving cut flowers, they are by no means limited in their utility to such a use. By reason of their high porosity and light weight, they are also of value as heat and sound insulating materials for a wide variety of industrial uses. They also are of value as reservoir materials for slowly releasing volatile deodorant and/or perfume materials into a room from a suitable container, as disclosed in my copending application Serial No. 595,907, filed July 5, 1956, now Patent Number 2,850,321.

The porous bodies of the present invention are made from an aerated slurry consisting essentially of partially calcined gypsum (plaster of Paris) and water in about equal parts plus a very small quantity of a water-soluble, foam producing, surface active agent (foaming agent). The partially calcined gypsum may be any of the common, commercial, finely ground gypsum molding plasters preferably containing no added set retarder or accelerator. The foaming agent may be any of a wide variety of water-soluble surface active agents so long as they are active foam producers, and are substantially neutral (neither strongly alkaline nor strongly acidic) where the product is to be used for holding and preserving cut flowers which might be adversely affected by any substantial basicity or acidity of the water absorbed by the finished plaster bodies. For other uses, the pH of the foaming agent is of little moment, and is not highly critical in any event since the amount used is very small.

As used herein, the term "foaming agent" has reference to surface active agents which alter the surface tension of water, thereby causing it to entrap and hold air, as bubbles, when air is mechanically entrained in the water by agitation. Suitable foaming agents for use in accordance with the present invention may be anionic, cationic, or nonionic, since they are not relied upon to perform any chemical function other than to cause active foaming of water when agitated, by altering its surface tension, and to produce a relatively stable foam after the gypsum has been added.

As examples of suitable foaming agents, the following may be mentioned:

*Anionic agents*

"Ultrawet 60L" sold by The Atlantic Refining Co. and consisting of triethanolamine neutralized dodecylbenzene sulfonic acids.

"Duponol WA" sold by E. I. du Pont de Nemours & Co. and consisting of the sodium salt of lauryl alcohol sulfate.

Various naphthalene sulfonic acids and their salts, and other petroleum sulfonate salts, are water-soluble and have similar foaming properties rendering them useful for the purposes of the present invention.

*Cationic agents*

"Ninol X" sold by Ninol Laboratories, Inc. and consisting of a condensation product of diethanolamine and stearic acid.

"Arquad" series of compounds sold by Armour and Company and consisting of long chain monoalkyl quaternary ammonium salts of the general formula:

$$R-N\begin{matrix}CH_3\\ CH_3\end{matrix}{}^{CH_3}_{Cl}$$

in which R is an alkyl chain having from about 8 to 18 carbon atoms.

"Sapamine CH" sold by Ciba Pharmaceutical Products, Inc. and consisting of oleyl amino diethylamine hydrochloride.

The monoalkyl substituted quaternary ammonium salts in general, containing a relatively long alkyl chain, include many strong, water-soluble foaming agents that are suitable for the purposes of the present invention.

*Nonionic agents*

"Triton" series of compounds sold by Rohm & Haas Company and consisting of alkyl aryl polyether alcohols of the following formula:

$$CH_3-C(CH_3)_2-CH_2-C(CH_3)_2-C_6H_4-(OCH_2CH_2)_xOH$$

where $x$ is predominantly in the range of about 7 to about 13.

The polyether alcohols in general, containing large alkyl radicals and/or phenolic radicals with large side chains include many strong, water-soluble foaming agents that are substantially neutral and suitable for use in the present invention for practically all purposes.

The general classes of surface active materials and the specific proprietary materials mentioned above are well known in the art and provide a wide field from which suitable water-soluble foaming agents may be selected. From the differences in chemical character of the above examples, it will be obvious that the chemical composition of the foaming agent is unimportant and in no sense critical as regards its utility in practicing the present invention.

The amount of the foaming agent used depends upon its activity as a foam producer and upon the degree of porosity desired in the product. Generally, the amount of foaming agent will be in the range of about 0.1% to 1.0% by weight of the water used in the plaster slurry. For example, when using "Ultrawet 60L," the amount preferably used is from about 0.2% to about 0.4% by weight of the water, and, when using "Triton X-100," the amount preferably used is about 0.15% to about 0.35% by weight of the water. The amount of foaming agent and the violence of agitation of the water to which it is added are regulated to produce a foam volume about five times the unfoamed volume of water.

The procedure by which the porous plaster bodies of the invention are made involves a distinct departure from what has heretofore been customary in making aerated plaster slurries. Instead of adding water and a foaming agent, separately or together to the settable plaster material, I first mix the water and foaming agent and beat or whip it into a froth. Then, while continuing to agitate the froth, the plaster of Paris is gradually added to the froth over a period of about 1 to 3 minutes according to the size of the batch being handled. Preferably, the froth is agitated during the addition of the plaster of Paris so as to create a vortex, or other rapidly moving froth surface of relatively large area, and the plaster of Paris is sifted over the froth surface and is rapidly carried into and uniformly mixed with the mass of froth by virtue of the agitation.

When using approximately equal parts of water and plaster of Paris, the slurry will reach a condition of incipient setting in from about ½ to 2 minutes after the addition of the plaster of Paris has been completed, depending upon the speed of the addition. Thereupon, the agitation equipment is quickly stopped.

If a large block of the foamed plaster is the desired product, the frothed slurry may be allowed to complete its setting in the mixing container, the agitating equipment being first withdrawn, of course. However, in most instances it is preferable to quickly pour the foamed plaster into separate molds of appropriate size and shape while the mix is still in a flowable condition and will level out in the molds. The mix will normally be fully set in from 20 to 25 minutes after reaching the point of incipient setting. The cast blocks or slabs may then be removed from the molds for use, storage, or packaging for shipment as desired. The blocks or slabs may be of sizes and shapes suitable for use, as cast, in flower bowls, vases and the like, or for various heat or sound insulating purposes, or they may be cast in larger blocks to be later cut up into smaller pieces of any desired shapes for the purposes for which they are to be used.

The rate at which the plaster of Paris is added to the aqueous foam will depend somewhat upon the manner and violence of agitation, which controls the rate at which the surface of the foam is moving to carry the plaster of Paris into the mass of foam. This rate of addition should not be so great that it will have any marked tendency to break down the foam. For example, I have sifted 20 pounds of plaster of Paris in 1.5 minutes onto a vortex surface of froth (containing 20 pounds of water that has undergone a five-fold expansion in volume during formation of the foam), while causing only about 3% to 5% reduction in volume of the froth during the period of addition. Upon quickly stopping the agitation of the slurry after another minute of agitation, the slurry was at the point of incipient setting, but remained sufficiently flowable by gravity for about another minute for the slurry to be poured into molds and to level out in the molds to produce blocks having substantially flat upper surfaces.

The advantages of my mixing procedure over the prior methods of making aerated plaster slurries are that:

(1) There appears to be no tendency for the plaster of Paris to agglomerate and the mixing time need not be extended to obtain uniform dispersion of the plaster of Paris, whereby there is less danger of excessive setting before the mixing has been completed and production time per batch is reduced.

(2) About a 20% greater slurry volume and, hence, a corresponding increase in the porosity of the final product are achieved.

The first of the above advantages means fewer batch failures due to premature setting and increased production speed. The second of the above advantages means that a superior product is obtained due to its reduced specific gravity and the consequently greater water absorbing and insulating values of the product and reduced shipping weight, and also that a greater volume of product is obtained from a given quantity of raw materials.

A preferred recipe for carrying out the invention on a modest production scale is to incorporate in each batch the following ingredients:

| Ingredient: | Amount |
| --- | --- |
| Water | pounds__ 20 |
| Foaming agent (Triton 100) | ounces__ 0.9 |
| Plaster of Paris | pounds__ 20 |

In the above recipe, the amount of plaster of Paris may be dropped to as low as about 18 pounds or raised to as high as about 24 pounds, while keeping the amount of water and foaming agent unchanged. The lower ratios of plaster of Paris to water provide slightly more fluid slurries and slightly slower setting time but less strength, and the larger ratios have the reverse effect.

The foaming agent in the above recipe may be replaced by an amount of any of the water-soluble foaming agents identified above which will produce an equivalent foaming tendency. These and other water-soluble foaming agents may be used alone or in combination with one another as will be apparent to those skilled in the art.

Having described my invention, I claim:

1. A method of making aerated, settable, plaster slurries comprising adding a minor amount of water-soluble foaming agent to a measured quantity of water, agitating the water to produce a mass of aqueous foam, and, while continuing such agitation, gradually adding onto the surface of the mass of foam from about 0.9 part to about 1.2 parts by weight of dry plaster of Paris to 1 part of water in the foam, and continuing said agitation until the plaster of Paris is substantially uniformly distributed throughout the mass of foam and the resulting aerated slurry has reached a condition of incipient setting.

2. A method according to claim 1 in which the amount of said foaming agent and violence of said agitation are regulated to produce a volume of foam about 5 times the initial volume of water.

3. A method of making aerated, settable, plaster slurries comprising adding a minor amount of a water-soluble foaming agent to a measured quantity of water, agitating the water to produce a mass of aqueous foam, and, while continuing such agitation, gradually adding onto the surface of the mass of foam from about 0.9 part to about 1.2 parts by weight of dry plaster of Paris to 1 part of water in the foam, and continuing said agitation until the plaster of Paris is substantially uniformly distributed throughout the mass of foam and the resulting aerated slurry has reached a condition of incipient setting, as evidenced by a detectable stiffening of the completed slurry after addition of all of the plaster of Paris, and stopping said agitation while the slurry is still sufficiently fluid to flow and level itself by gravity to a condition providing a substantially flat upper surface of the slurry mass.

4. A method of making aerated, settable, plaster slurries comprising adding a minor amount of a water-soluble foaming agent to a measured quantity of water, agitating the water to produce a mass of aqueous foam and keep the surface of the foam in motion, and, while continuing said agitation, gradually adding onto the moving surface of the foam from about 0.9 part to about 1.2 parts by weight of dry plaster of Paris to 1 part of water in the foam, and continuing said agitation until the plaster of Paris is substantially uniformly distributed throughout the mass of foam and the resulting aerated slurry has reached a condition of incipient setting.

5. A method of making aerated, settable, plaster slurries comprising adding a minor amount of a water-soluble foaming agent to a measured quantity of water, agitating the water to produce a mass of aqueous foam, and, while continuing such agitation, gradually adding onto the surface of the mass of foam from about 0.9 part to about 1.2 parts by weight of dry plaster of Paris to 1 part of water in the foam, and continuing said agitation until the plaster of Paris is substantially uniformly distributed throughout the mass of foam and the resulting aerated slurry has reached a condition of incipient setting as evidenced by a detectable stiffening of the completed slurry after addition of all of the plaster of Paris, and stopping said agitation while the slurry is still sufficiently fluid to flow freely when poured, and pouring the slurry into molds while it is still sufficiently fluid to flow by gravity and level itself in the molds.

6. A method according to claim 5 in which the plaster of Paris is added by sifting it lightly over the moving surface of the mass of foam at a rate insufficient to cause any substantial breaking of the foam.

7. A method according to claim 5 in which the plaster of Paris is added by sifting it lightly over the moving surface of the mass of foam at a rate insufficient to cause any substantial breaking of the foam, the amount of water and plaster of Paris being limited to an amount such that the plaster of Paris is added over a period of time up to about 3 minutes and the addition is completed prior to incipient setting of the resulting slurry.

8. As an article of manufacture, a porous, set, plaster of Paris body consisting substantially entirely of hydrated plaster of Paris having sufficient, small, intercommunicating pores therein to absorb and hold, in a substantially immobile state, about 36 ounces of water per 100 cubic inches of said body, and said body, when dry, having sufficient structural strength to be handled in blocks and slabs of substantial thickness but otherwise having virtually no flexural or compressive strength and being sufficiently soft to be cut with a knife blade without appreciable crumbling to either side of the knife blade, and said body, when saturated with water, being sufficiently soft to be easily penetrated by the stems of cut flowers.

References Cited in the file of this patent

UNITED STATES PATENTS 2,731,377   Riddell et al. _____ Jan. 17, 1951